US008663472B1

(12) United States Patent
Mallard et al.

(10) Patent No.: US 8,663,472 B1
(45) Date of Patent: Mar. 4, 2014

(54) MULTI-CHAMBERED HYDROCLONE (75) Inventors: John H. Mallard, Saratoga, CA (US);
Eugene A. Mckay, Woodside, CA (US);
Steven E. O'Reilly, Menlo Park, CA
(US); Scott T. Burr, Midland, MI (US)

(73) Assignee: Dow Global Technologies LLC,
Midland, MI (US)

( * ) Notice: Subject to any disclaimer, the term of this
patent is extended or adjusted under 35
U.S.C. 154(b) by 0 days.

(21) Appl. No.: 13/581,578

(22) PCT Filed: May 1, 2012

(86) PCT No.: PCT/US2012/035966
§ 371 (c)(1),
(2), (4) Date: Aug. 28, 2012

(87) PCT Pub. No.: WO2012/154448
PCT Pub. Date: Nov. 15, 2012

Related U.S. Application Data (60) Provisional application No. 61/483,221, filed on May 6, 2011.

(51) Int. Cl.
*B01D 36/00* (2006.01)
*B01D 21/26* (2006.01)
(52) U.S. Cl.
CPC ............... *B01D 36/00* (2013.01); *B01D 21/26* (2013.01)
USPC ........................................ 210/304; 210/305
(58) Field of Classification Search
CPC .............................. B01D 21/26; B01D 36/00
USPC ...................... 210/512.1, 304, 305
See application file for complete search history.

(56) References Cited

U.S. PATENT DOCUMENTS

| 431,448 A | 7/1890 | Dixon |
| 1,107,485 A | 8/1914 | Bowser |

(Continued)

FOREIGN PATENT DOCUMENTS

| DE | 4420730 | 5/1995 |
| DE | 19914674 | 12/2000 |

(Continued)

OTHER PUBLICATIONS

International Prelimnary Report on Patentability for PCT/US2012/035966, Nov. 2013.*

(Continued)

*Primary Examiner* — David A Reifsnyder
(74) *Attorney, Agent, or Firm* — Edward W. Black (57) ABSTRACT A hydrocyclone (10) having a tank (12) including a fluid inlet (14), a filtered fluid outlet (16), an effluent outlet (18), a process fluid outlet (20) and an inner peripheral wall (22) enclosing three vertically aligned chambers (24, 30, 32) including a vortex chamber (24) in fluid communication with the fluid inlet through a fluid pathway (28) adapted for receiving an incoming fluid flow and generating a vortex fluid flow about a filter assembly (26) which is located within the vortex chamber which encloses a filtrate chamber (66) which is in fluid communication with the filtered fluid outlet (16). An effluent separation chamber (30) is located bellow the vortex chamber and is in fluid communication with the vortex chamber and the effluent outlet. A process fluid chamber is located bellow the effluent separation chamber and is in fluid communication with the effluent separation chamber and the process fluid outlet.

8 Claims, 11 Drawing Sheets

(56) References Cited

U.S. PATENT DOCUMENTS

| | | |
|---|---|---|
| 1,919,653 A | 7/1933 | Hill |
| 2,706,045 A | 4/1955 | Large |
| 2,788,087 A | 4/1957 | Lenehan |
| 2,917,173 A | 12/1959 | Rakowsky |
| 3,061,098 A | 10/1962 | Brezinski |
| 3,219,186 A | 11/1965 | Polhemus et al. |
| 3,285,422 A | 11/1966 | Wiley |
| 3,529,724 A | 9/1970 | Maciula et al. |
| 3,822,533 A | 7/1974 | Oranje |
| 3,893,914 A | 7/1975 | Bobo |
| 4,062,766 A | 12/1977 | Duesling |
| 4,120,783 A | 10/1978 | Baummer |
| 4,146,468 A | 3/1979 | Wilson |
| 4,159,073 A | 6/1979 | Liller |
| 4,178,258 A | 12/1979 | Papay et al. |
| 4,216,095 A | 8/1980 | Ruff |
| 4,298,465 A | 11/1981 | Druffel |
| 4,414,112 A | 11/1983 | Simpson et al. |
| 4,575,406 A | 3/1986 | Slafer |
| 4,651,540 A | 3/1987 | Morse |
| 4,662,909 A | 5/1987 | Durr |
| 4,698,156 A | 10/1987 | Bumpers |
| 4,865,751 A | 9/1989 | Smisson |
| 5,104,520 A | 4/1992 | Maronde et al. |
| 5,116,516 A | 5/1992 | Smisson |
| 5,188,238 A | 2/1993 | Smisson et al. |
| 5,227,061 A | 7/1993 | Bedsole |
| 5,277,705 A | 1/1994 | Anderson et al. |
| 5,407,584 A | 4/1995 | Broussard, Sr. |
| 5,466,384 A | 11/1995 | Prevost et al. |
| 5,478,484 A | 12/1995 | Michaluk |
| 5,593,043 A | 1/1997 | Ozmerih |
| 5,879,545 A | 3/1999 | Antoun |
| 5,972,215 A | 10/1999 | Kammel |
| 6,110,242 A | 8/2000 | Young |
| 6,117,340 A | 9/2000 | Carstens |
| 6,210,457 B1 | 4/2001 | Siemers |
| 6,238,579 B1 | 5/2001 | Paxton et al. |
| 6,251,296 B1 | 6/2001 | Conrad et al. |
| 6,531,066 B1 | 3/2003 | Saunders et al. |
| 6,613,231 B1 | 9/2003 | Jitariouk |
| 6,790,346 B2 | 9/2004 | Caleffi |
| 6,896,720 B1 | 5/2005 | Arnold et al. |
| 7,166,230 B2 | 1/2007 | Nilsen et al. |
| 7,316,067 B2 | 1/2008 | Blakey |
| 7,351,269 B2 | 4/2008 | Yau |
| 7,632,416 B2 | 12/2009 | Levitt |
| 7,651,000 B2 | 1/2010 | Knol |
| 7,785,479 B1 | 8/2010 | Hosford |
| 7,854,779 B2 | 12/2010 | Oh |
| 7,896,169 B2 | 3/2011 | Levitt et al. |
| 7,998,251 B2 | 8/2011 | Pondelick et al. |
| 8,201,697 B2 * | 6/2012 | Levitt et al. ............ 210/304 |
| 2003/0029790 A1 | 2/2003 | Templeton |
| 2003/0221996 A1 | 12/2003 | Svoronos et al. |
| 2004/0211734 A1 | 10/2004 | Moya |
| 2005/0109684 A1 | 5/2005 | DiBella et al. |
| 2007/0039900 A1 | 2/2007 | Levitt |
| 2007/0045168 A1 | 3/2007 | Levitt et al. |
| 2007/0075001 A1 | 4/2007 | Knol |
| 2007/0187328 A1 | 8/2007 | Gordon |
| 2010/0044309 A1 | 2/2010 | Lee |
| 2010/0083832 A1 | 4/2010 | Pondelick et al. |
| 2011/0120959 A1 * | 5/2011 | Levitt et al. ............ 210/304 |
| 2011/0160087 A1 | 6/2011 | Zhao et al. |
| 2011/0220586 A1 | 9/2011 | Levitt |
| 2012/0010063 A1 | 1/2012 | Levitt et al. |
| 2012/0145609 A1 | 6/2012 | Caffell et al. |
| 2013/0126421 A1 | 5/2013 | Levitt et al. |

FOREIGN PATENT DOCUMENTS

| | | |
|---|---|---|
| DE | 102007039182 | 7/2010 |
| EP | 0375671 | 6/1990 |
| EP | 0475252 | 3/1992 |
| EP | 0566792 | 10/1993 |
| FR | 2791904 | 10/2000 |
| GB | 2309182 | 7/1997 |
| GB | 2423264 | 8/2006 |
| KR | 2004105165 | 12/2004 |
| KR | 0899416 | 5/2009 |
| WO | 0218056 | 3/2002 |
| WO | 03026832 | 4/2003 |
| WO | 2004064978 | 8/2004 |
| WO | 2011160087 | 12/2011 |

OTHER PUBLICATIONS

DOW Water & Process Solutions, G. Onifer, Oct. 2010, Executive Summary: Clean Filtration Technologies, Inc Turboclone Filter.

Clean Filtration Technologies, Inc. CFT Turboclone Demo System, 2010.

Clean Filtration Technologies, Inc. CFT Turboclone TC-201 Technical Datasheet, 2010.

* cited by examiner

MULTI-CHAMBERED HYDROCLONE

RELATED APPLICATIONS

This application claims priority from U.S. Provisional Application No. 61/483,221 filed 6 May 2011, the entire subject matter of which is incorporated by reference.

TECHNICAL FIELD

The invention is generally directed toward hydroclones and cyclonic separation of fluids.

BACKGROUND

Hydroclones are commonly used to separate suspended particles from liquids. In a typical embodiment, pressurized feed liquid (e.g. waste water) is introduced into a conically shaped chamber under conditions that create a vortex within the chamber. Generally, feed liquid is introduced near the top of a conical chamber and an effluent stream is discharged near the bottom of the chamber. Centrifugal forces associated with the vortex urge denser particles towards the periphery of the chamber. As a result, liquid located near the center of the vortex has a lower concentration of particles than that at the periphery. This "cleaner" liquid can then be withdrawn from a central region of the hydroclone. Examples of hydroclones are described in: U.S. Pat. No. 3,061,098, U.S. Pat. No. 3,529,724, U.S. Pat. No. 5,104,520, U.S. Pat. No. 5,407,584 and U.S. Pat. No. 5,478,484. Separation efficiency can be improved by including a filter within the chamber such that a portion of the liquid moving to the center of the chamber passes through the filter. In such embodiments, cyclonic separation is combined with cross-flow filtration. Examples of such embodiments are described in: U.S. Pat. No. 7,632,416, U.S. Pat. No. 7,896,169, US2011/0120959 and US2012/0010063. While such hybrid designs improve separation efficiency, further improvements are desired. The entire subject matter of each of the previously cited references is incorporated herein by reference.

SUMMARY

The invention includes multiple embodiments of hydroclones and methods for performing cyclonic separations using the same. In one embodiment, the invention includes a hydroclone (10) having a tank (12) including a fluid inlet (14), a filtered fluid outlet (16), an effluent outlet (18), a process fluid outlet (20) and an inner peripheral wall (22) enclosing a plurality of vertically aligned chambers. While differing numbers of chambers may be used, in one embodiment the tank (12) includes three vertically aligned chambers including a vortex chamber (24) in fluid communication with the fluid inlet (14). A filter assembly (26) is located within the vortex chamber (24) and encloses a filtrate chamber (66). The vortex chamber (24) includes a fluid pathway (28) adapted for receiving incoming fluid and generating a vortex fluid flow about the filter assembly (26). The filtrate chamber (66) is in fluid communication with the filtered fluid outlet (16) such that fluid passing through the filter assembly (26) enters the filtrate chamber (66) and may exit the tank (12) by way of the filtered fluid outlet (16). An effluent separation chamber (30) is located below and in fluid communication with the vortex chamber (24) and is adapted for receiving unfiltered fluid from the vortex chamber (24). A process fluid chamber (32) is located below and in fluid communication with the effluent separation chamber (30) and is adapted for receiving a process fluid from the effluent separation chamber (30) wherein the process fluid chamber (32) is in fluid communication with the process fluid outlet (20) by which process fluid may exit the tank (12). A vortex flow barrier (34) is located between the vortex and effluent separation chambers (24, 30) and disrupts vortex fluid flow from the vortex chamber (24) to the effluent separation chamber (30). An effluent barrier (36) is located below 10 the effluent separation chamber (30) and directs fluid flow from the effluent separation chamber (30) to the process fluid outlet (20), and wherein the effluent barrier (36) further comprises a centrally located effluent opening (38) in fluid communication with the effluent outlet (18) by which effluent exits the tank (12). Multiple embodiments are described.

BRIEF DESCRIPTION OF THE DRAWINGS

Various aspects of the invention may be better understood by reference to the following description taken in conjunction with the accompanying drawings wherein like numerals have been used throughout the various views to designate like parts. The depictions are illustrative and are not intended to be to scale or otherwise limit the invention.

DETAILED DESCRIPTION

The present invention generally relates to the hydroclone filtration devices and related methods of conducting cyclonic separation. For purposes of the present description, the term "hydroclone" refers to a filtration device that at least partially relies upon centrifugal forces generated by vortex fluid flow to separate constituents from a fluid mixture. Examples include the separation of solid particles from a liquid mixture and separation of mixtures including liquids of differing densities (e.g. oil and water). Specific applications include the treatment of: pulp effluent generating by paper mills, process water generated by oil and gas recovery, bilge water and municipal and industrial waste water.

Figure 1A:
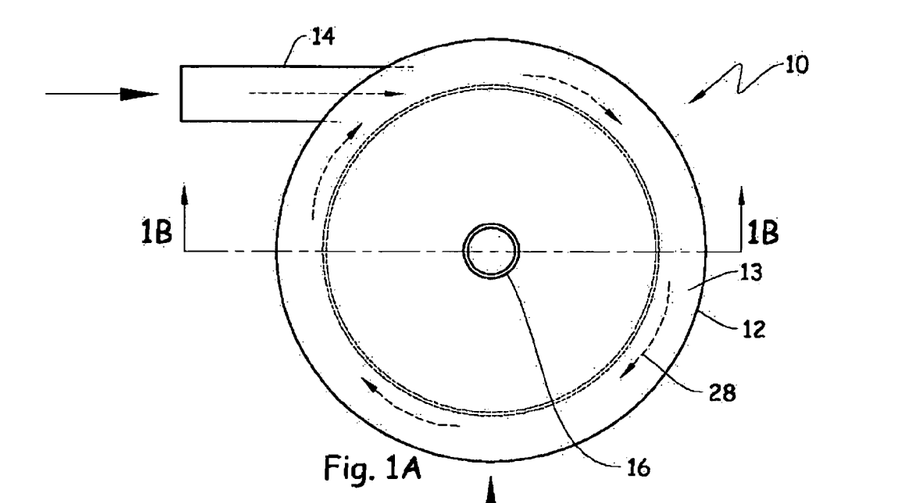
FIG. 1A an elevational view showing one embodiment of the invention.
Figure 1B:
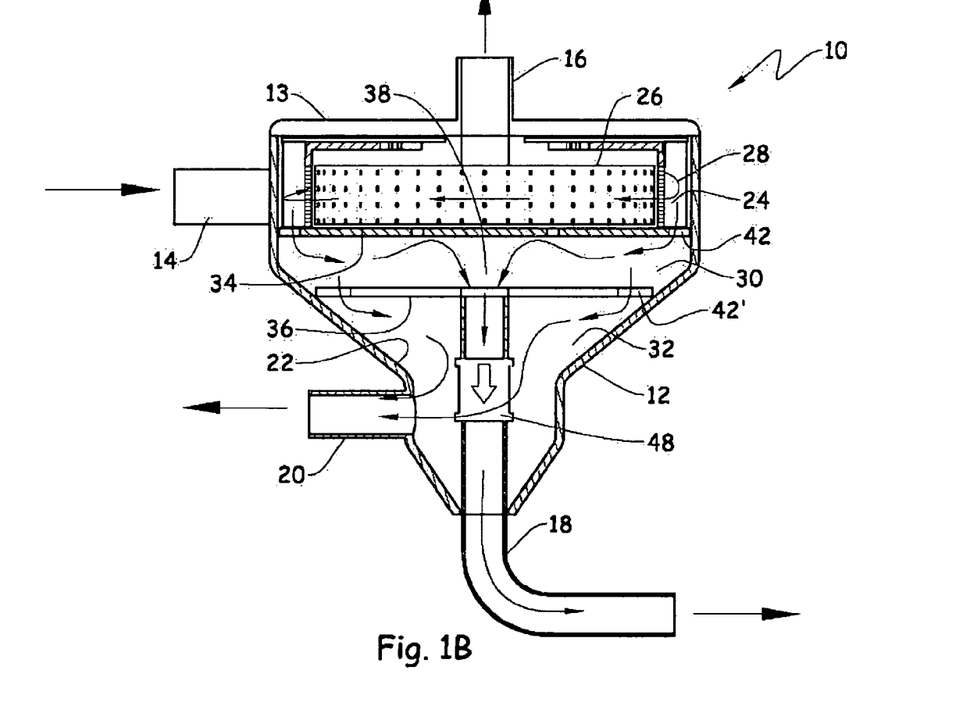
FIG. 1B is a cross-sectional view taken along lines 1B-1B of FIG. 1A.
Figure 2:
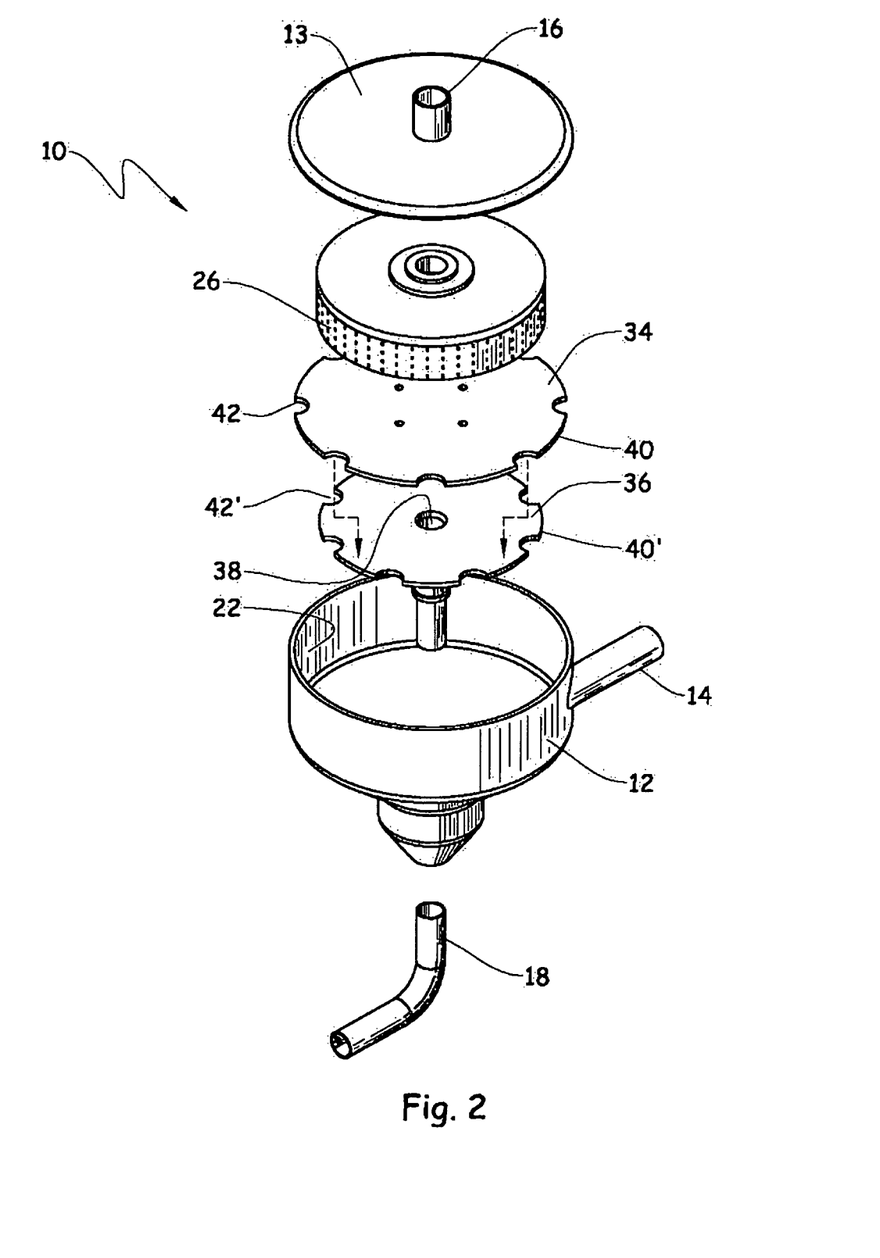
FIG. 2 is an exploded perspective view of the embodiment shown in FIGS. 1A and B.

One embodiment of the invention is illustrated in FIGS. 1-3 including a hydroclone generally shown at 10 including a tank (12) having a removable lid (13), a fluid inlet (14), a filtered fluid outlet (16), an effluent outlet (18), a process fluid outlet (20) and an inner peripheral wall (22) enclosing a plurality of vertically aligned chambers (24, 30, 32). While depicted as including three vertically aligned chambers, additional chambers may also be included. Similarly, additional fluid inlets and outlets may also be included. While shown as having a cylindrical upper section and a frustro-conical base, the tank (12) may have other configurations including an entirely cylindrical shape as will be described in connection with FIGS. 8 and 9.

Figure 7A:
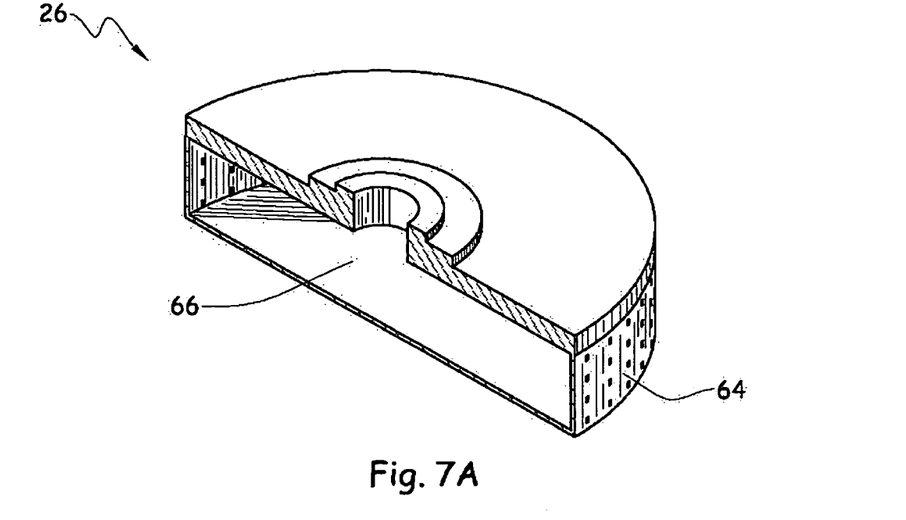
FIG. 7A is a perspective partially cut away view of a filter assembly.

The tank (12) includes a vortex chamber (24) in fluid communication with the fluid inlet (14). A filter assembly (26) is centrally located within the vortex chamber (24) and encloses a filtrate chamber (66), (as best shown in FIG. 7A). The filtrate chamber (66) is in fluid communication with the filtered fluid outlet (16). An effluent separation chamber (30) is located below and is in fluid communication with the vortex chamber (24). The effluent separation chamber (30) is adapted for receiving unfiltered fluid from the vortex chamber (24). A process fluid chamber (32) is in turn located below and is in fluid communication with the effluent separation chamber (30). The process fluid chamber (32) is adapted for receiving a process fluid from the effluent separation chamber (30) and is in fluid communication with the process fluid outlet (20) by which process fluid may exit the tank (12).

Figure 6:
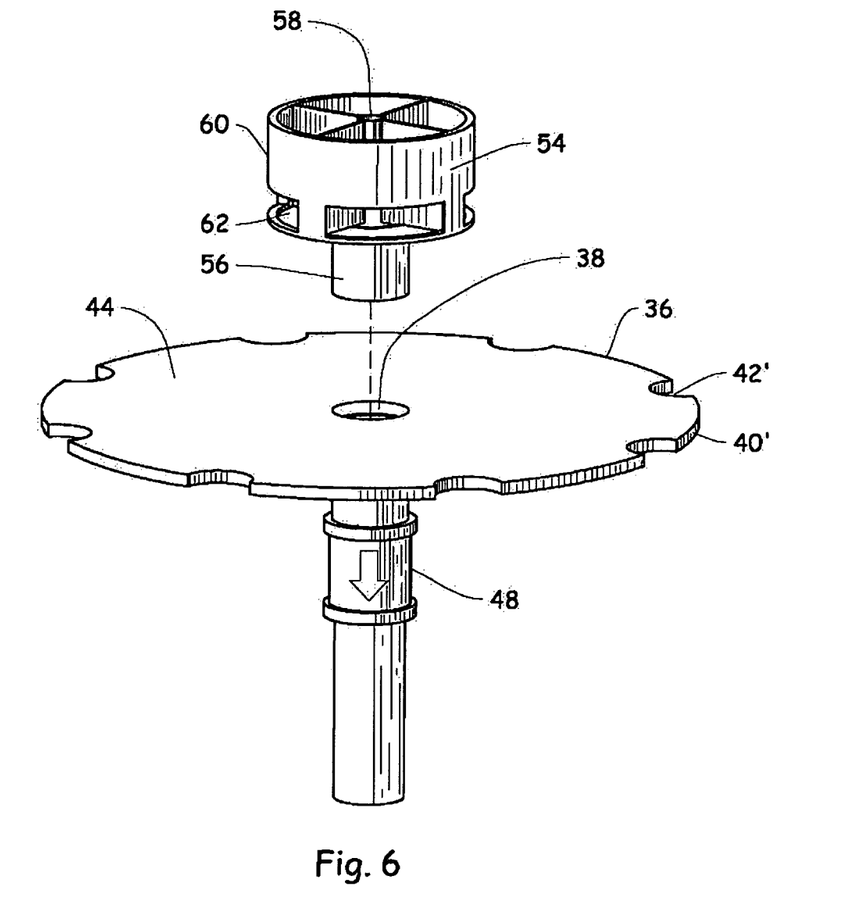
FIG. 6 is an exploded view of an effluent barrier with an effluent insert.

A vortex flow barrier (34) is located between the vortex and effluent separation chambers (24, 30) and directs fluid flow between the vortex and effluent separation (24, 30) chambers to locations adjacent to the inner peripheral wall (22) of the tank (12). The vortex flow barrier (34) may be designed to maintain vortex fluid flow in the effluent separation chamber (24) and disrupt vortex fluid flow (28) as fluid flows from the vortex chamber (24) into the effluent separation chamber (30). More specifically, the vortex flow barrier (34) includes an outer periphery (40) extending to locations adjacent to or in contact with the inner peripheral wall (22) of the tank (12) and may further include a plurality of apertures (42) located near the periphery (40) and extending therethrough. In the illustrated embodiment, the apertures (42) are scalloped-shaped but alternative shapes may also be used (as best shown in FIG. 6).

Figure 4A:
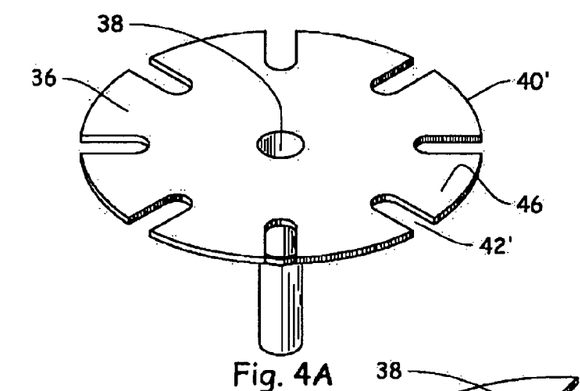
FIGS. 4A-C are perspective views of additional embodiments of effluent barriers.
Figure 4B:
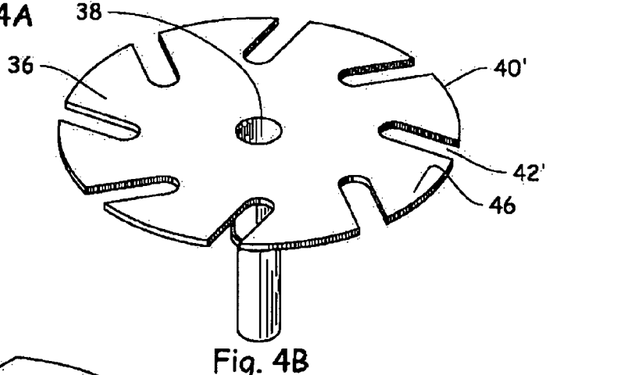
Figure 4C:
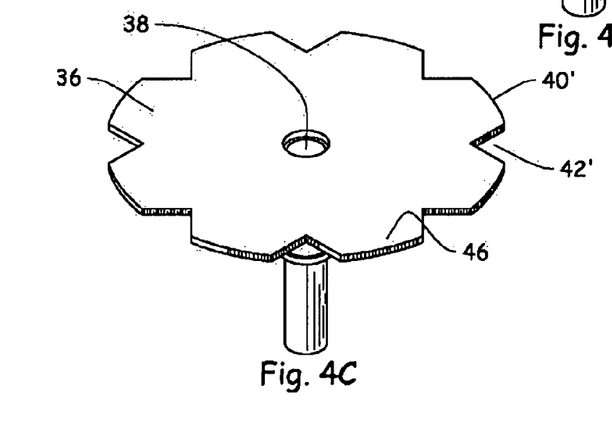

An effluent barrier (36) is located below the effluent separation chamber (30) and is adapted to direct fluid flow from the effluent separation chamber (30) to the process fluid outlet (20). The effluent barrier (36) includes an outer periphery (40') extending to locations adjacent to or in contact with the inner peripheral wall (22) of the tank (12) and may further include a plurality of apertures (42') located near the periphery (40') and extending therethrough. In the illustrated embodiment, the apertures (42') are scalloped-shaped but alternative shapes may also be used (as best shown in FIG. 4). In a preferred embodiment, the apertures (42) of the vortex flow barrier (34) are vertically off-set from the apertures (42') of the effluent barrier (36), as shown by dotted arrows in FIG. 2. The effluent barrier (36) also includes a centrally located effluent opening (38) in fluid communication with the effluent outlet (18) by which effluent may exit the tank (12).

In operation, pressurized feed fluid (e.g. preferably from 4 to 120 psi) enters the tank (12) via the fluid inlet (14) and follows along fluid pathway (28) which generates a vortex about the filter assembly (26). Centrifugal forces urge denser materials toward the inner peripheral wall (22) of the tank (12) while less dense liquid flows radially inward toward the filter assembly (26). A portion of this liquid flows through the filter assembly (26) into a filtrate chamber (66) and may subsequently exit the tank (12) as "filtrate" by way of the filtered fluid outlet (16). The remaining "non-filtrate" flows downward from the vortex chamber (24) to the effluent separation chamber (30). The vortex flow barrier (34) directs the majority (e.g. preferably at least 75% and in some embodiments at least 90%) of such downward flow to locations along or adjacent to an inner peripheral wall (22) of the tank (12). This arrangement is believed to help maintain vortex flow within the vortex chamber (24) while disrupting the vortex flow as fluid enters the effluent separation chamber (30). Fluid flow slows in the effluent separation chamber (30) and denser materials (e.g. particles) preferentially settle toward the center of the effluent barrier (34) and enter into the effluent opening (38) and may then exit the tank by way of effluent outlet (18). The effluent outlet (18) may optionally include a valve (48) (e.g. one-way check value) to selectively control removal of effluent from the tank (12). The remaining liquid (hereinafter referred to as "process fluid") in the effluent separation chamber (30) flows downward into the process fluid chamber (32). The effluent barrier (36) directs a majority (e.g. preferably at least 75% and in some embodiments at least 90%) of fluid flow between the effluent separation vortex and process fluid chambers (34, 36) to locations along or adjacent to an inner peripheral wall (22) of the tank (12), i.e. through apertures (42'). In most applications, process fluid represents a mid-grade product that may be re-used, disposed of or recycled back to the fluid inlet (14) for further treatment. "Filtrate" typically represents a high grade product that may be re-used or disposed of. "Effluent" represents a low grade product that may be further treated or disposed of. However, it should be appreciated that in some applications, effluent may represent a valuable product.

The feed fluid inlet pressure and spacing between the outer periphery of the filter assembly (26) and the inner peripheral wall (22) of the tank (12) can be optimized to create and maintain a vortex fluid flow within the vortex chamber (24). In order to further facilitate the creation and maintenance of vortex fluid flow, the fluid inlet (14) preferably directs incoming feed fluid on a tangential path about the vortex chamber, as indicated by dotted arrows in FIG. 1A.

Figures 3A, 3B, 3C, 3D:
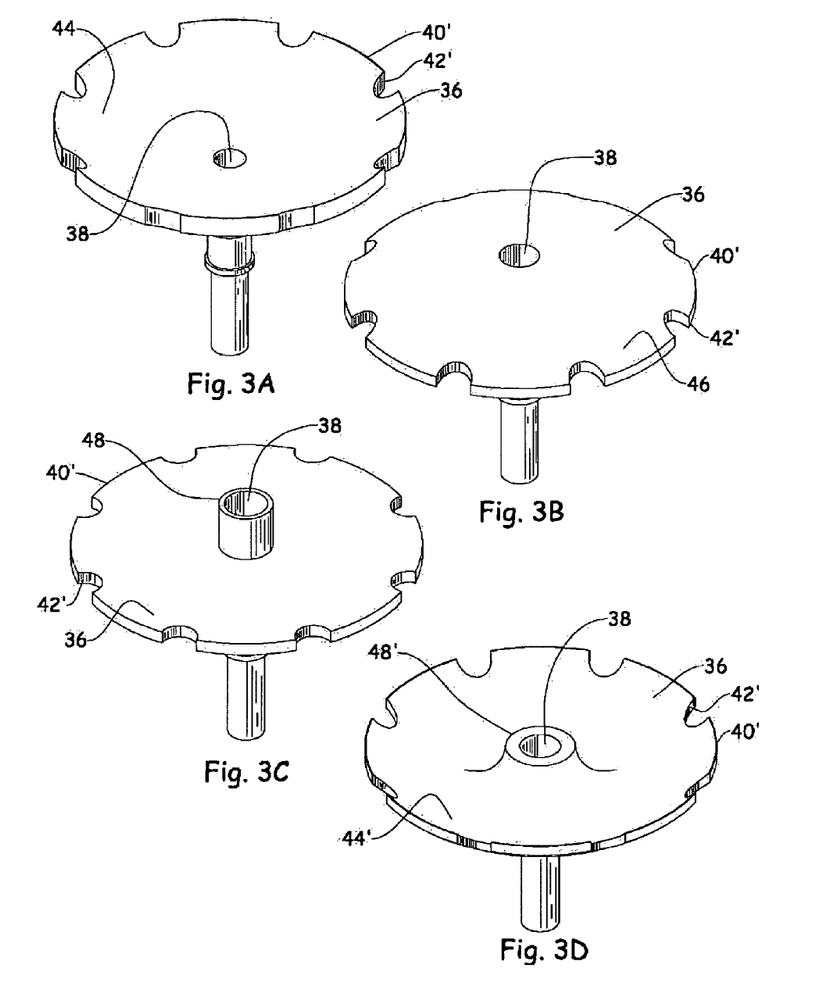
FIGS. 3A-H are perspective views of various embodiments of effluent barriers.
Figure 3E:
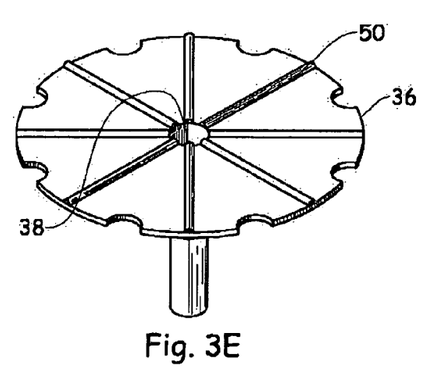
Figure 3F:
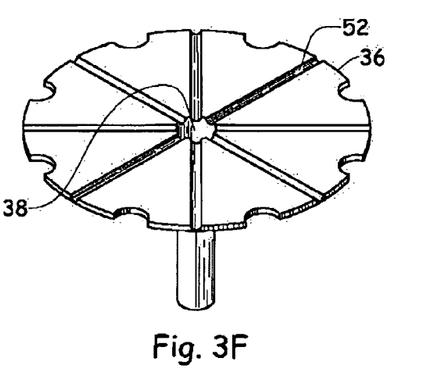
Figure 3G:
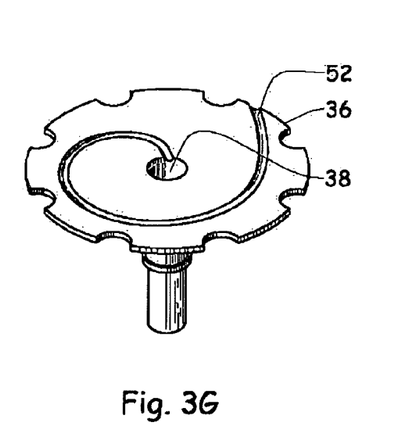
Figure 3H:
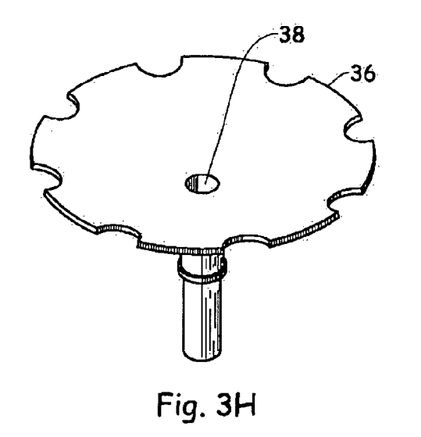

Ideal configurations of the vortex flow barrier (34) and effluent barrier (36) can be determined based upon the operating conditions of the hydroclone and composition of the feed fluid. A variety of embodiments of the effluent barrier (36) are illustrated in FIGS. 3A-I. For example, rather than utilizing a flat plate-like configuration as illustrated in FIGS. 1-3 (e.g. circular flat surface having an outer periphery 40), the effluent barrier (36) may include alternative configurations wherein a central region, (i.e. directly adjacent the effluent opening (38)) is located at a lower or higher position relative to the periphery. Representative examples are illustrated in FIGS. 3A-D, e.g. FIG. 3A illustrates a bowl-like configuration including an upward facing concave surface (44). While shown as including a constant degree of curvature, the degree of curvature may vary across the surface (44). FIG. 3B illustrates a similar design including an upward facing convex surface (46). FIG. 3C illustrates an embodiment including a plate-like configuration including a raised wall (48) about the effluent opening (38). FIG. 3D illustrates an embodiment including shared features from both FIGS. 3A and 3C, i.e. a concave surface (44') and a raised wall (48') about the effluent opening (38). FIGS. 3E-F illustrate plate-like configurations which may include one or more radially extending ridges (50) and grooves (52), whereas FIG. 3G illustrates the use of a spiral shaped groove (52). While not shown, ridges and grooves (whether radial or spiral), may also be combined together or used separately with the configurations illustrated in FIGS. 3A-D. Each of the illustrated embodiments is designed to facilitate collection of denser materials or particles based upon the specific feed flow conditions and composition. FIG. 3H shows a preferred embodiment including a conical shape including a conical angle of about 80° (i.e. 80° from a vertical axis, 10° from a horizontal axis). Preferred conical angles are from 45° to 85°. While not illustrated, many of these illustrated features are also applicable to the vortex flow barrier (34), e.g. convex and concave upward facing surfaces.

Figure 5A:
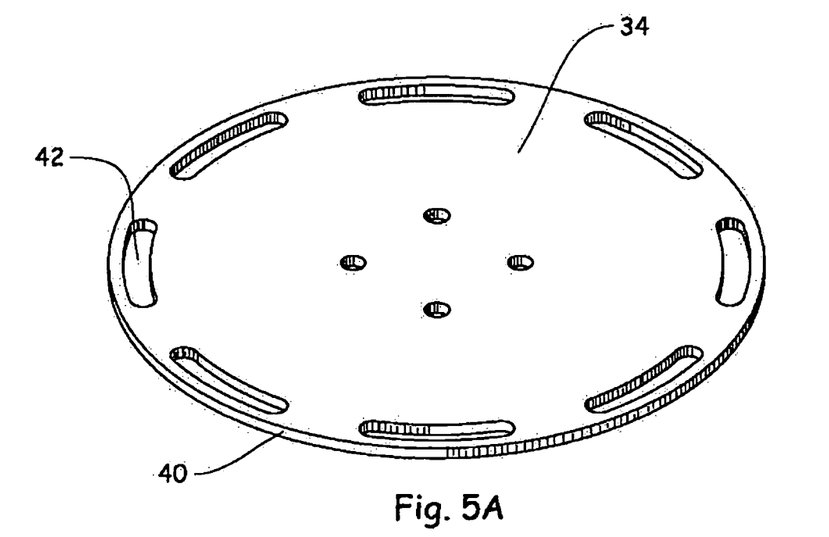
FIG. 5A-B are perspective views of various embodiments of vortex barriers.
Figure 5B:
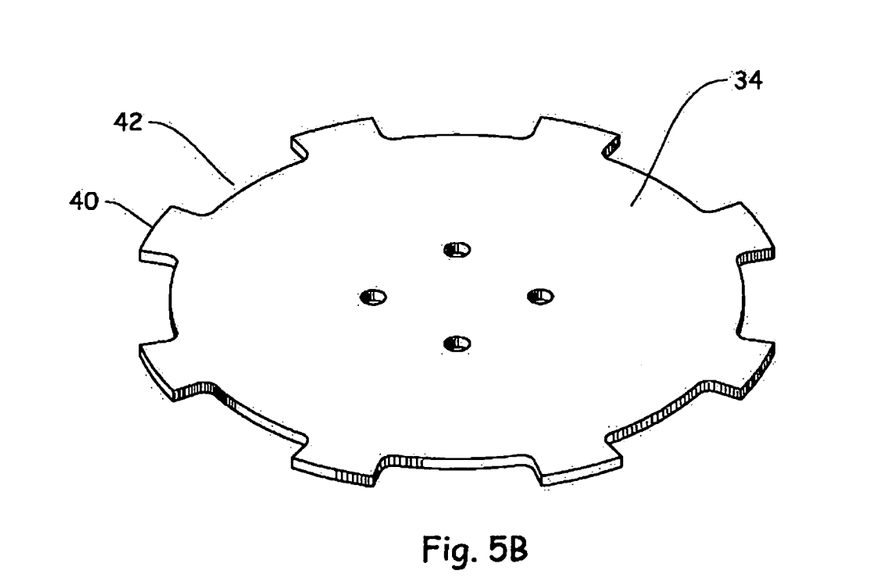

While in one embodiment the effluent barrier (36) includes scalloped-shaped apertures (42'), alternatively shaped apertures may also be used including radial slots, angled slots and triangular openings located about the outer periphery (40'), as illustrated in FIGS. 4A-C. Similarly, alternatively shaped apertures (42) may be used with respect to the vortex flow barrier (34), as illustrated in FIGS. 5A-B. The shape and size of the aperture (42, 42') may be designed to control the flow of fluid downward through the chambers (24, 30, 32) of the tank (12), with flow being preferentially directed to the inner peripheral wall (22) of the tank (12). With that said, a minority (e.g. less than 50% and more preferably less than 75% and still more preferably less than 90%) of the downward flow (i.e. non-effluent fluid with respect to the effluent barrier (36)) may occur at alternative locations including the center location of one or both barriers (42, 36). In yet other non-illustrated embodiment, one or both of the vortex flow barrier (34) and effluent barrier (36) may include outer peripheries that do not contact the inner peripheral wall (22) of the tank (12) and include no apertures.

FIG. 6 shows an optional effluent insert (54) adapted to fit within the effluent opening (38) of the effluent barrier (36). While shown in combination with a flat-plate like configuration barrier (36), the insert (54) may also be used in combination with the other embodiments as illustrated in FIGS. 3A-H and 4A-C. The effluent insert (54) includes a concentric tube configuration including an end (56) adapted to snugly fit into the effluent opening (38) and extend upwardly therefrom. An inner tube (58) extends along at least a portion of the length of the insert (54) and provides a pathway for fluid to flow upward. An outer tube (60) include one or more apertures (62), e.g. slots, located at the intersection of the upper surface (44) of the effluent barrier (36) and the insert (54). The insert (54) is designed to slow fluid flow and facilitate the flow of denser materials into the effluent opening (38) while permitting less dense fluids to flow upward out of the insert (54). While shown as a separate component part, the insert (54) may form an integral part of the effluent barrier (36).

As shown in FIGS. 1-3, the filter assembly (26) is preferably centrally located within the vortex chamber (24) and evenly spaced from the inner peripheral wall (22) of the tank (12). While shown as being cylindrical, other configurations may be used including stepped and conical shaped filters. As best shown in FIG. 7A, the filter assembly (26) includes a porous membrane (64) which may be fabricated from a wide variety of materials include polymers, ceramics and metals. In one embodiment, the membrane is relatively thin, e.g. from 0.2-0.4 mm and is supported by an underlying rigid frame or porous support (not shown). A representative example is described in US2012/0010063. The pore size (e.g. 1 to 500 micron), shape (e.g. V-shape, cylindrical, slotted) and uniformity of the membrane (64) may vary depending upon application. In many preferred embodiments, the membrane (64) comprises a corrosion-resistant metal (e.g. electroformed nickel screen) including uniform sized pores having sizes from 10 to 100 microns. Representative examples of such materials are described: U.S. Pat. No. 7,632,416, U.S. Pat. No. 7,896,169, US2011/0120959, US 2011/0220586 and US2012/0010063, the entire subject matter of which is incorporated herein by reference. The membrane (64) surrounds a filtrate chamber (66) that is in fluid communication with the filtered fluid outlet (16).

Figure 7B:
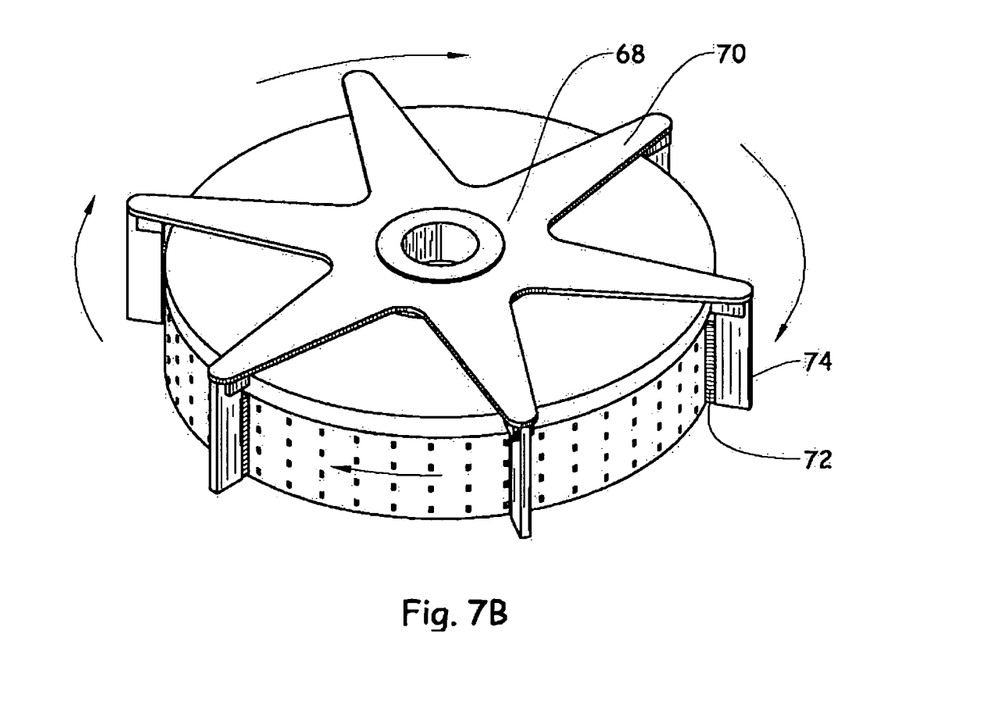
FIG. 7B is a perspective view of the filter of FIG. 7A including a cleaning assembly.

The subject hydroclone (10) may further include a cleaning assembly (68) for removing debris from the membrane surface (64) of the filter assembly (26). A representative embodiment is illustrated in FIG. 7B wherein the assembly (68) is mounted on the top surface of the filter assembly (26) and includes one or more spokes (70) extending radially outward. A brush (72) extends downward from the end of the spoke (70) and engages (e.g. touches or comes very near to) the surface of the membrane substrate (64). While shown as a brush (72), alternative cleaning means may be included including wipers, squeegees or scrappers. From 2 to 50 brushes, and preferably from 18 to 24 brushes are used in most embodiments. As represented by curved arrows, the cleaning assembly (68) rotates about filter assembly (26) such that the brush (72) sweeps the surface of the membrane substrate (54) and removes debris, e.g. by creating turbulence near the surface or by directly contacting the surface. One or more paddles (74) may be mounted to the end of at least one spoke (70) such that fluid flowing into the vortex chamber (24) rotates the cleaning assembly (68) about the filter assembly (26). Spacing paddles (74) evenly about the filter assembly adds stability to the rotating movement of the cleaning assembly (68) and may help maintain vortex fluid flow in the vortex chamber (24). While shown as extending radially outward from the surface of the membrane substrate (64), the paddles may be slanted, (e.g. from −5° to −30° or 5° to 30° from the radial axis) to increase rotational velocity. Bearings may be used between the filter and cleaning assemblies (26, 68) to further facilitate rotation without impeding vortex fluid flow. In alternative embodiments not shown, the cleaning assembly (68) may be driven by alternative means, e.g. electronic motor, magnetic force, etc. In yet another embodiment, the filter assembly may move relative to a fixed cleaning assembly.

Figure 8:
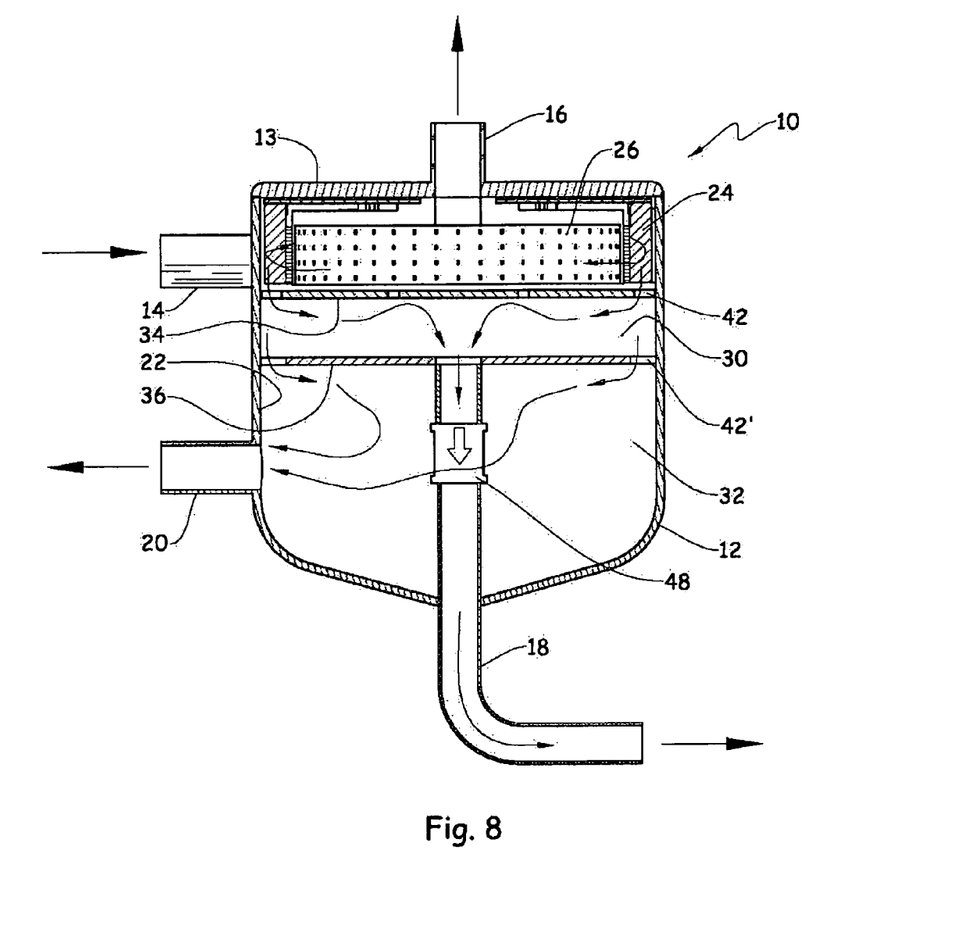
FIG. 8 is a cross-sectional view showing an alternative embodiment of the invention.
Figure 9:
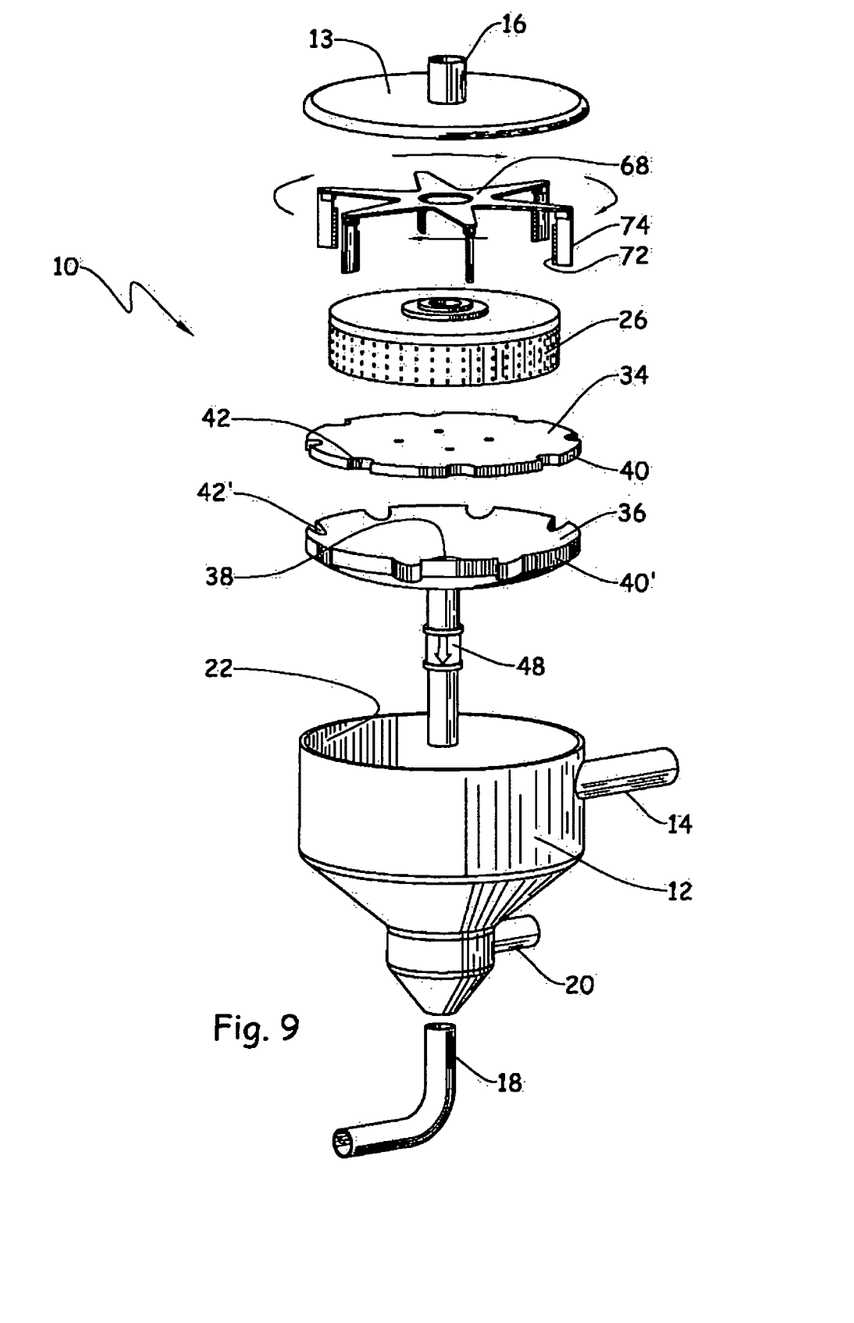
FIG. 9 is an exploded perspective view the embodiment of FIG. 8.

An alternative embodiment of the hydroclone (10) including a cylindrical tank (12) is illustrated in FIGS. 8-9, incorporating the cleaning assembly (68) illustrated in FIG. 7B. The depicted embodiment further includes the effluent barrier (36) illustrated in FIG. 3I.

EXAMPLES

By way of further illustration, four different hydroclones were tested using an aqueous feed fluid including 2000 ppm of 200 μm plastic particles having a specific gravity of 1.1. The hydroclones had the general configuration as shown in FIGS. 1-3 but further included the cleaning assembly as illustrated in FIG. 7B including 20 μm pores. The effluent opening (38) had an inner diameter of approximately 2 inches.

Hydroclone 1 (♦) included no effluent barrier (36).

Hydroclone 2 (■) included a flat circular effluent barrier (36) with no apertures (42') and had a diameter approximately 10 mm less than the inner diameter of the tank (12).

Hydroclone 3 (●) included a flat circular effluent barrier having a diameter extending to the inner peripheral wall (22) of the tank (12) and which had scallop-shaped apertures (42') as illustrated in FIGS. 1B and 2.

Hydroclone 4 (▲) included a cone-shaped effluent barrier having a diameter extending to the inner peripheral wall (22) of the tank (12) and including scalloped-shaped apertures (42') as illustrated in FIG. 3I.

Figure 10:
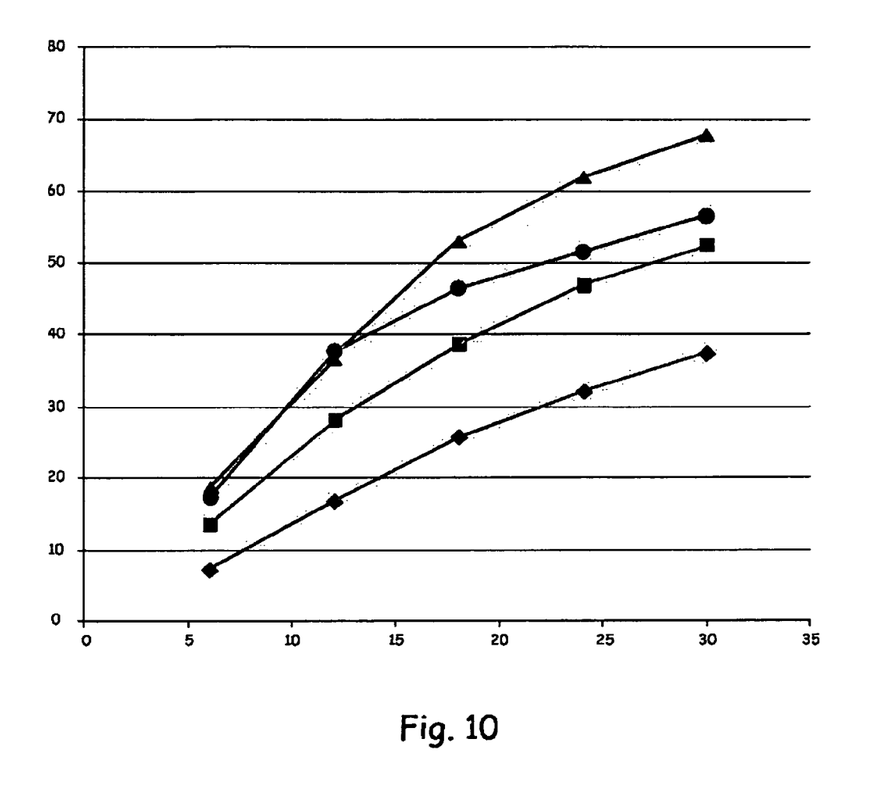
FIG. 10 is a graph including test data generated according to the Examples.

All Hydroclones were tested under the same conditions. More specifically, 100 gallons (378.5 l) of feed fluid was pumped into the feed inlet (14) of the hydroclone at a rate of 30 gpm (112.6 l/minute) from a holding tank. Filtrate was removed from the filtered fluid inlet (16) at a rate of 30 gpm (112.6 l/minute) and was returned to the holding tank. The pressure differential across the filter substrate (54) was approximately 0.5 psi (3.5 KPa). Process fluid from the process fluid outlet (20) was re-circulated and re-introduced into the fluid feed inlet (14) at a rate of 120 gpm (454.2 l/min). Every six minutes, the valve (48) was opened to remove and analyze the effluent (plastic particles). The results of the testing are summarized in FIG. 10 wherein the Y-axis represents the cumulative percent mass removed from the feed fluid in 6 minute intervals and the X-axis represents the run time of the experiment. As is clear from these experimental results, the hydroclones including the various embodiments of the subject effluent plate demonstrated significantly improved separation efficiencies. While the Examples highlight the separation of solid particles from an aqueous liquid, the subject hydroclones are also effective at separating liquid mixtures including liquids of differing densities, e.g. water and oil, or complex mixtures including liquid-liquid mixtures include various solids.

The subject hydroclones provide unexpectedly superior separation efficiencies as compared with previous designs. These efficiencies allow the hydroclone to be used a broader range of applications; particular in embodiments where process fluid is recycled and optionally blended with make-up feed fluid. Broadly stated, feed fluid is subjected to a synergistic combination of multiple separation processes within a single device. Specifically, feed fluid is subject to cyclonic separation based at least partially upon density with denser material (e.g. particles, liquids) being urged toward the inner periphery of the tank. Fluid passing through the filter assembly is additionally subjected to cross-flow separation. While separation through the filter assembly may be based upon particle size, other means of separation may also be used depending upon the selection of separation media utilized in the filter assembly. For example, separation may also be based at least partially upon hydrophilicity or charge density. While not wishing to be bound by theory, the effluent barrier is believed to provide yet another means of separation as the flow of denser materials or larger particles slows and the radial fluid velocity drag forces exceed any residual centrifugal forces lingering from the vortex such that these denser materials (e.g. particles, liquids) are collected within the effluent opening. These synergistic separations are further enhanced by the use of barriers (34, 36) that limit fluid flow in constrained areas about the inner peripheral wall of the hydroclone tank. The use of a cleaning assembly may still further enhance separations by clumping debris from the filter assembly and thereby add to its effective particle size or density, both of which are believe to improve separation in the effluent chamber.

The invention claimed is:

1. A hydroclone (10) comprising a tank (12) including a fluid inlet (14), a filtered fluid outlet (16), an effluent outlet (18), a process fluid outlet (20) and an inner peripheral wall (22) enclosing a plurality of vertically aligned chambers comprising:

a vortex chamber (24) in fluid communication with the fluid inlet (14), a filter assembly (26) located within the vortex chamber (24) and enclosing a filtrate chamber (66), a fluid pathway (28) adapted for receiving incoming fluid and generating a vortex fluid flow about the filter assembly (26), wherein the filtrate chamber (66) is in fluid communication with the filtered fluid outlet (16) such that fluid passing through the filter assembly (26) enters the filtrate chamber (66) and exits the tank (12) by way of the filtered fluid outlet (16), an effluent separation chamber (30) located below and in fluid communication with the vortex chamber (24) which is adapted for receiving unfiltered fluid from the vortex chamber (24), a process fluid chamber (32) located below and in fluid communication with the effluent separation chamber, (30) which is adapted for receiving a process fluid from the effluent separation chamber (30) and wherein the process fluid chamber (32) is in fluid communication with the process fluid outlet (20) by which process fluid exits the tank (12), a vortex flow barrier (34) located between the vortex and effluent separation chambers (24, 30) which disrupts vortex fluid flow (28) as fluid flows from the vortex chamber (24) to the effluent separation chamber (30), and an effluent barrier (36) located below the effluent separation chamber (30) which directs fluid flow from the effluent separation chamber (30) to the process fluid outlet (20), and wherein the effluent barrier (36) further comprises a centrally located effluent opening (38) in fluid communication with the effluent outlet (18) by which effluent exits the tank (12).

2. The hydroclone (10) of claim 1 wherein the vortex flow barrier (34) directs a majority of fluid flow between the vortex and effluent separation (24, 30) chambers to locations adjacent to the inner peripheral wall (22) of the tank (12).

3. The hydroclone (10) of claim 1 wherein the effluent barrier (36) limits a majority of fluid flow between the effluent separation and process fluid chambers (34, 36) to locations adjacent to the inner peripheral wall (22) of the tank (12).

4. The hydroclone (10) of claim 1 wherein the effluent barrier (36) further comprises an outer periphery (40') extending to locations adjacent to the inner peripheral wall (22) of the tank (12), and further comprises a plurality of apertures (42') extending therethrough.

5. The hydroclone (10) of claim 1 wherein at least one of the vortex flow barrier (34) and effluent barrier (36) comprise a plate-shaped configuration.

6. The hydroclone (10) of claim 1 wherein the vortex flow barrier (34) and effluent barrier (36) both comprise configurations including an outer periphery (40, 40') extending to locations adjacent to the inner peripheral wall (22) of the tank (12), and further comprise a plurality of apertures (42, 42') extending through the barriers (34, 36) at locations adjacent to their outer periphery (40, 40') that permit fluid flow therethrough.

7. The hydroclone (10) of claim 6 wherein the apertures (42) of the vortex flow barrier (34) are vertically off-set from the apertures (42') of the effluent barrier (36).

8. The hydroclone (10) of claim 1 wherein the effluent barrier (36) comprises a central region that is lower or higher than the outer periphery (40).

* * * * *